US006207267B1

US 6,207,267 B1

(12) United States Patent
Shimomura et al.

(10) Patent No.: US 6,207,267 B1
(45) Date of Patent: \*Mar. 27, 2001

(54) MAGNETIC RECORDING MEDIUM AND PROCESS FOR ITS PRODUCTION

(75) Inventors: Osamu Shimomura; Yoshihiro Kinoshita; Makoto Ochi, all of Kanagawa (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/507,751

(22) Filed: Apr. 17, 2000

Related U.S. Application Data

(63) Continuation of application No. 09/055,889, filed on Apr. 7, 1998, now Pat. No. 6,051,308.

(30) Foreign Application Priority Data

Nov. 22, 1996 (JP) ....................................................... 8-311706
Jan. 29, 1997 (JP) ....................................................... 9-15214
Apr. 8, 1997 (JP) ....................................................... 9-89571

(51) Int. Cl.$^7$ ........................................................ G11B 5/74
(52) U.S. Cl. ........................ 428/323; 428/328; 428/329; 428/694 BS; 428/900
(58) Field of Search .................................... 428/323, 328, 428/329, 694 BS, 900; 427/128

(56) References Cited

U.S. PATENT DOCUMENTS

| 4,774,147 | * | 9/1988 | Kuse et al. ............................ 428/323 |
| 5,549,955 | * | 8/1996 | Kawamata et al. .................. 428/65.3 |
| 5,792,548 | * | 8/1998 | Kuwajima et al. ................... 428/215 |
| 5,851,622 | * | 12/1998 | Ejiri et al. ............................ 428/65.3 |

\* cited by examiner

*Primary Examiner*—Steven A. Resan
(74) *Attorney, Agent, or Firm*—Oblon, Spivak, McClelland, Maier & Neustadt, P.C.

(57) ABSTRACT

A magnetic recording medium comprising a flexible non-magnetic support, a non-magnetic primer layer containing a binder and non-magnetic particles, formed on the support, and a magnetic layer having a thickness of at most 0.5 μm and containing a binder and a ferromagnetic acicular metal powder having an average long axis length (L) of at most 0.20 μm and an aspect ratio (K) of at most 15, formed on the primer layer, wherein the variation (D) of the interface between the magnetic layer and the non-magnetic primer layer is represented by $D \leq 2L/K$.

8 Claims, No Drawings

MAGNETIC RECORDING MEDIUM AND PROCESS FOR ITS PRODUCTION

This is a continuation of application Ser. No. 09/055,889 filed Apr. 7, 1998 now U.S. Pat. No. 6,051,308.

BACKGROUND OF THE INVENTION

FIELD OF THE INVENTION

The present invention relates to a magnetic recording medium having a non-magnetic primer layer containing a binder and non-magnetic particles, on a flexible non-magnetic support, and having a magnetic layer containing a binder and a ferromagnetic acicular metal powder, thereon. Particularly, it relates to a magnetic recording medium which is excellent in durability and suitable for high density recording.

DISCUSSION OF BACKGROUND

In recent years, it has strongly been demanded to adapt magnetic recording media to high density recording with a high frequency. In view of such a demand, a study has been made on a magnetic recording medium employing a thin metal film for the magnetic layer. However, a coating type magnetic recording medium is superior from the viewpoint of the productivity, durability, corrosion resistance, etc., and improvements of a coating type magnetic recording medium have been studied from various aspects. In high frequency recording, problems in the overwriting characteristics and self-demagnetization loss during recording, are substantial, and to avoid such problems, it is necessary to make the magnetic layer thin. However, if the magnetic layer is simply made thin, the durability and the surface property deteriorate. Therefore, a magnetic recording medium of a double layer structure has heretofore been proposed wherein a non-magnetic layer composed mainly of a non-magnetic powder and a binder, is formed beneath the magnetic layer (JP-A-62-154225, JP-A-62-159338). However, with such a double layer structure only, it has been difficult to obtain a magnetic recording medium which is excellent in durability and in electromagnetic conversion characteristics and thus is suitable for high density recording.

JP-A-7-287833 proposes to improve the surface property of the magnetic layer by coating a coating material for a non-magnetic primer layer containing a non-magnetic powder treated with antimony or tin for coating and coating a coating material for a magnetic layer containing a magnetic powder while the coating material for the primer layer is still in a wet state. However, if the upper layer is coated while the lower layer is still in a wet state, the interface will be roughened, and the electromagnetic conversion characteristics tend to deteriorate, when the thickness of the upper layer is thin. Further, the roughening of the interface influences the surface, whereby no satisfactory surface property can be obtained.

It is an object of the present invention to solve such problems and to provide a magnetic recording medium having a magnetic layer and a non-magnetic layer laminated, wherein roughening of the interface between the two layers is little, whereby the electromagnetic conversion characteristics are excellent, and a process for its production.

SUMMARY OF THE INVENTION

The present invention provides a magnetic recording medium comprising a flexible non-magnetic support, a non-magnetic primer layer containing a binder and non-magnetic particles, formed on the support, and a magnetic layer containing a binder and a ferromagnetic acicular metal powder or a hexagonal ferromagnetic powder (hereinafter sometimes referred to generally as the ferromagnetic metal powder), formed on the primer layer, wherein the ferromagnetic acicular metal powder is one having an average long axis length (L) of at most 0.2 and an aspect ratio (K) of at most 15, and the hexagonal ferromagnetic powder is one having a plate length (L') of at most 0.07 $\mu$m and a plate ratio (K') of at most 10, and the thickness of the magnetic layer is at most 0.5 $\mu$m, and wherein the variation (D) of the interface between the magnetic layer and the non-magnetic primer layer is represented by $D \leq 2L/K$ or $D \leq 2L'/K'$, whereby it is possible to obtain a magnetic recording medium which is excellent in durability and in the electromagnetic conversion characteristics, particularly the output and overwriting characteristics, and which is suitable for high density recording.

DETAILED DESCRIPTION OF THE PREFERRED EMBODIMENTS

The magnetic recording medium of the present invention is one having a non-magnetic primer layer formed on a flexible non-magnetic support and having a magnetic layer further laminated thereon. If desired, another layer may be formed between the support and the non-magnetic primer layer, or on the magnetic layer.

The flexible non-magnetic support may be made of any optional material which is commonly used in such applications. Typical examples include polyesters such as polyethylene terephthalate and polyethylene-2,6-naphthalene, polyolefins such as polypropylene, cellulose derivatives such as cellulose triacetate and cellulose diacetate, and plastics such as aramide and polycarbonate. The shape of the flexible non-magnetic support is usually a film-form or a tape-form. Further, in order to improve the adhesion between this flexible non-magnetic support and the non-magnetic primer layer, corona discharge treatment or surface treatment by a surface modifier such as an aqueous amine solution, trichloroacetic acid or a phenol, may be applied to the flexible non-magnetic support.

The non-magnetic primer layer is composed mainly of non-magnetic particles and a binder. As the non-magnetic particles, it is preferred to employ carbon black. However, as other materials, titanium oxide, $\alpha$-iron oxide, $\alpha$-alumina, silicon carbide, chromium oxide, cerium oxide, geothite, corundum, silicon nitride, silicon dioxide, tin oxide, magnesium oxide, zirconium dioxide, calcium carbonate, calcium sulfate, barium sulfate and molybdenum disulfide may, for example, be employed.

When carbon black is used as the non-magnetic particles, its volatile content is usually at least 3%, preferably from 3 to 10%. The present inventors have found that the amount of the volatile content relates to the dispersibility of carbon black. Namely, up to a volatile content of about 10%, the dispersibility of carbon black is usually improved as the volatile content increases. If the volatile content is less than 3%, such carbon black is poor in the dispersibility and tends to deteriorate the durability of the magnetic recording medium. Here, the volatile content is meant for the volatile loss according to JIS K-6221-1982 when carbon black is put in porcelain or platinum crucible with a lid and heated at 950° C. for 7 minutes. The carbon black preferably constitutes from 30 to 98 wt %, particularly preferably from 35 to 85 wt %, of the non-magnetic primer layer.

Further, the specific surface area of the carbon black is preferably at least 100 m²/g, more preferably from 100 to 150 m²/g. In the non-magnetic primer layer and in the magnetic layer thereon, an organic lubricant such as an aliphatic carboxylic acid or its ester, is contained in many cases. If carbon black having an extremely small specific surface area, is employed, the action of the non-magnetic primer layer to maintain such an organic lubricant, tends to be weak, whereby the durability of the magnetic recording medium is likely to deteriorate.

Further, the average particle size of primary particles of carbon black is preferably from 20 to 100 nm.

As the binder, it is preferred to employ one which is excellent in the abrasion resistance and adhesion to the support and which has a glass transition point of from −100 to 150° C. and a number average molecular weight of from about 1,000 to 150,000. Commonly employed binders include, for example, a polyurethane resin, a polyester resin, a cellulose derivative such as cellulose acetate butyrate, cellulose diacetate or nitrocellulose, a vinyl chloride type resin such as a vinyl chloride-vinyl acetate copolymer, a vinyl chloride-vinylidene chloride copolymer or a vinyl chloride-acrylic copolymer, various synthetic rubbers such as a styrene-butadiene copolymer, an epoxy resin and a phenoxy resin. These binders may be used alone or in combination as a mixture of two or more of them. It is preferred to use the binder so that its content in the non-magnetic primer layer will be from 2 to 50 wt %, particularly from 5 to 35 wt %.

Further, the binder is preferably reacted with a crosslinking agent such as a low molecular weight polyisocyanate compound having a plurality of isocyanate groups, such as a trimethylol propane adduct of toluidine isocyanate, to form a three dimensional network structure in the non-magnetic primer layer. The non-magnetic primer layer may contain other components, as the case requires in addition to the binder and carbon black or other non-magnetic particle. For example, an organic lubricant such as fatty acid or a fatty acid ester may be contained, so that it will defuse in a very smaller amount to the surface of the magnetic layer. In such a case, it is preferred to increase the ratio of the non-magnetic particles to the binder in the non-magnetic primer layer so that the organic lubricant is present stably as adsorbed on the non-magnetic particles in the non-magnetic primer layer, and it is able to diffuse over a long period of time. Usually this ratio is set to be at least 3.6 by a weight ratio, whereby the durability will be improved. In calculation of this ratio, when a crosslinking agent is employed, such a crosslinking agent should be included in the binder.

The magnetic layer is required to contain a binder and the ferromagnetic acicular powder or the hexagonal ferromagnetic powder, and the thickness of the magnetic layer is at most 0.5 μm. If the magnetic layer is thicker than 0.5 μm, such a magnetic layer tends to be not suitable for high density recording with respect to the self-demagnetization loss, the overwriting characteristics, etc. The thickness of the magnetic layer is preferably from 0.01 to 0.5 μm, particularly preferably from 0.05 to 0.3 μm.

As the ferromagnetic acicular metal powder, one having an average long axis length (L) of at most 0.20 μm, preferably at most 0.12 μm, and an aspect ratio (K) of at most 15, preferably at most 12, is used. The lower limit of the aspect ratio is preferably about 5. As other characteristic, the specific surface area is preferably at least 40 m²/g, particularly preferably at least 45 m²/g, as measured by a BET method. If the specific surface area is small, it tends to be difficult to increase the filling amount of the magnetic powder in the magnetic layer. Further, as the magnetic characteristics, σ is preferably at least 140 emu/g, and the coercive force (Hc) is preferably at least 1500 Oe.

As the hexagonal ferromagnetic powder, one having a plate length (L') of at most 0.07 μm, preferably at most 0.05 μm, and a plate ratio (K') of at most 10, is used. As the hexagonal ferromagnetic powder, most common is barium ferrite. However, one substituted by a metal such as strontium, lead, calcium or cobalt, may also be employed. The specific surface area of the hexagonal ferromagnetic powder is preferably from 40 to 70 m²/g as measured by a BET method, the coercive force is preferably at least 1000 Oe, and σs is preferably at least 50 emu/g.

The ferromagnetic acicular metal powder or the hexagonal ferromagnetic powder is preferably incorporated in an amount from 50 to 90 wt %, more preferably from 65 to 80 wt %, in the magnetic layer. If the proportion of the magnetic powder is small, it tends to be difficult to increase the recording density. On the other hand if this proportion is too large, the durability of the magnetic recording medium tends to be low.

The ferromagnetic acicular metal powder or the hexagonal ferromagnetic powder preferably has a specific surface area of at least 35 m²/g, more preferably at least 40 m²/g, as measured by a BET method.

As the binder, it is preferred to use one which is excellent in the abrasion resistance and adhesion to the non-magnetic primer layer and which has a glass transition point of from −100 to 150° C. and a number average molecular weight of from about 1,000 to 150,000. Commonly employed binders include, for example, a polyurethane resin, a polyester resin, a cellulose derivative such as cellulose acetate butyrate, cellulose diacetate or nitrocellulose, a vinyl chloride type resin such as a vinyl chloride-vinylacetate copolymer, a vinyl chloride-vinylidene chloride copolymer or a vinyl chloride-acrylic copolymer, various synthetic rubbers such as styrene-butadiene copolymer, an epoxy resin and a phenoxy resin. They may be used alone or in combination as a mixture of two or more of them. The binder is preferably used so that its content in the magnetic layer would be from 2 to 45 wt %, particularly from 5 to 25 wt %.

Further, the binder is preferably reacted with a crosslinking agent such as a low molecular weight polyisocyanate compound having a plurality of isocyanate groups, such as a trimethylol propane adduct of toluidine diisocyanate, to form a three dimensional network structure in the magnetic layer, whereby it is possible to improve the mechanical strength of the magnetic layer. Such a low molecular weight polyisocyanate compound is preferably used in an amount of from 10 to 50 wt % based on the binder.

Further, if a common binder is used as at least a part of the binders for the non-magnetic primer layer and the magnetic layer, the adhesion at the interface of both layers becomes good, such being preferred. As such a common binder material, it is preferred to employ a polyurethane, particularly polyurethane having substantially no polar group.

To the magnetic layer, various usual additives such as a dispersant, a lubricant, a polishing agent and an antistatic agent, may be incorporated. For example, as the dispersant, it is preferred to employ one having a phosphoric acid ester group, such as polyether phosphoric acid ester, or a polyoxyethylene alkyl phenyl phosphoric acid ester. As a dispersant having such phosphoric acid ester group, phosphatidyl choline (lecithin), RE-610 (manufactured by Toho Kagaku K.K.), or PW-36 (manufactured by Kusumoto Kasei K.K.) may, for example, be mentioned. In addition to one having such a phosphoric acid ester group, a $C_{12-18}$ fatty acid such as capric acid, lauric acid, myristic acid, oleic acid or linolic acid, an alkali metal or alkaline earth metal salt of such fatty acid, i.e. a metal soap, may be incorporated. The dispersant is used usually in such a amount that the content in the magnetic layer will be within a range of from 0.1 to 10 wt %, particularly preferably from 1 to 5 wt %.

As the lubricant, various types of lubricant may be used, such as an aliphatic type, fluorine-type, silicone-type or hydrocarbon-type lubricant. As the aliphatic type lubricant, a fatty acid, a metal salt of a fatty acid, an ester of a fatty acid, a fatty acid amide or an aliphatic alcohol, may, for example, be used. As the fatty acid, oleic acid, lauric acid, myristic acid, palmitic acid, stearic acid or behenic acid, may for example be used. As the metal salt of a fatty acid, a magnesium salt, aluminum salt, sodium salt or calcium salt of such a fatty acid, may be employed. As the fatty acid ester, a butyl ester, octyl ester or glyceride of such a fatty acid, may be employed. As the fatty acid amide, linolic acid amide or capronic acid amide may, for example, be used in addition to an amide of such a fatty acid. As the aliphatic alcohol, lauryl alcohol, mirystyl alcohol, palmityl alcohol, stearyl alcohol or oleyl alcohol, may, for example, be used. As the fluorine type lubricant, a perfluoroalkylpolyether, or a perfluoroalkylcarboxylic acid, may, for example, be used. As the silicone-type lubricant, silicone oil, or modified silicone oil, may, for example, be employed. Further, a solid lubricant such as molybdenum disulfide or tungsten disulfide, or a phosphoric acid ester, may also be used. As the hydrocarbon type lubricant, paraffin or squalane, may, for example, be employed.

The content of the lubricant in the magnetic layer is preferably from 0.1 to 15 wt %, more preferably from 3 to 10 wt %, most preferably from 5 to 10 wt %. Further, in the case of a magnetic recording medium having a magnetic layer of a multilayer structure, the content of the lubricant may change in each layer. For example, during coating, it may be applied in a large amount on the lower magnetic layer side and in a small amount on the upper magnetic layer side, because if the lubricant is deficient in the upper magnetic layer, it can be supplemented from the lower magnetic layer. Further, in the case of a magnetic layer of a multilayer structure, the content of the lubricant is preferably from 1 to 15 wt %, more preferably from 3 to 10%, in the total amount contained in all magnetic layers.

Further, the lubricant in the magnetic layer can be supplemented from the non-magnetic primer layer. Accordingly, the lubricant may be incorporated in at least one of the magnetic layer and the non-magnetic primer layer. And, the content of the lubricant is from 0.1 to 15 wt %, preferably from 3 to 10 wt %, more preferably from 5 to 10 wt %, based on the total weight of the magnetic layer and the non-magnetic primer layer.

The abrasive may, for example, be α-alumina, β-alumina, γ-alumina, α-iron oxide, silicon nitride, boron nitride, titanium oxide, silicon dioxide, tin oxide, zinc oxide, calcium carbonate, calcium sulfate, barium sulfate, molybdenum disulfide, tungsten oxide, silicon carbide or chromium oxide. These materials may be used alone or in combination as a mixture of two or more of them. Commercial products include, for example, AKP-20, AKP-30, AKP-50, HIT-50, HIT-100, manufactured by Sumitomo Chemical Co.,Ltd., TF-100, TF-120 and TF-140, manufactured by Toda Kogyo K.K., FT-1000 and FT-2000 manufactured by Ishihara Sangyo K.K., STT-4D, STT-30 and STT-65C manufactured by Titanium Kogyo K.K., and S-1, G5 and G7 manufactured by Nippon Kagaku Kogyo K.K. Among them, those having a relatively high hardness, are preferably employed. The average particle size of the abrasive is preferably at least 0.5 µm. The amount of the abrasive is preferably such that its content in the magnetic layer is within a range of from 1 to 10 wt %.

As an antistatic agent, carbon black, a metal or its electroconductive compound, a natural surfactant such as saponin, a non-ionic surfactant of e.g. alkylene oxide type or glycerin type, a cationic surfactant such as a higher alkylamine, a quaternary ammonium salt, a pyridinium salt or a salt of other nitrogen containing heterocyclic compound, an anion surfactant containing an acidic group such as a carboxylic acid group, a sulfonic acid group, a phosphoric acid group, a sulfonic acid ester group or a phosphoric acid ester group, or an amphoteric surfactant such as an amino acid, an amino sulfonic acid or a sulfonic acid or phosphoric acid ester or an amino alcohol, may, for example, be used. These surfactants may be used alone or in combination as a mixture.

As the carbon black, any one of acetylene black, furnace black and thermal black may be employed. Commercial products include, for example, BLACKPEARLS 2000, 1000, 900, 800, VALCAN XC-72, manufactured by Cabot Company, RAVEN 8800, 8000 and 7000, manufactured by Colombian Carbon Company, and #3750B, #3750, #3250B, #3250, #950, #850B, #650B, #45, #40, #5, MA-77 and MA-7, manufactured by Mitsubishi Chemical Corporation. These carbon blacks may be used alone or in combination as a mixture of two or more of them. Further, the surface of carbon black may be treated with e.g. a dispersant, or it may partially be graphitized before use.

As the electroconductive compound of metal, tin oxide or indium-tin oxide, may, for example, be used.

The amount of the antistatic agent is usually such that its content in the magnetic layer will be within a range of from 0.1 to 10 wt %. As is evident from the forgoing description, some of the additives may provide several effects simultaneously.

In the present invention, the magnetic layer may be a single layer or a multilayer comprising at least two magnetic layers. For example, in the case of a double-layered magnetic layer, a high density recording magnetic recording medium can be made by recording data with a shortwave length in the upper magnetic layer and servo signals with a longwave length in the lower magnetic layer. In such a case, the upper magnetic layer may be made to contain the above mentioned ferromagnetic powder and the binder and have a thickness of at most 0.5 µm and a surface roughness of at most 0.02 µm, and for the lower magnetic layer, a magnetic powder having a specific surface area of at least 30 m$^2$/g and a coercive force lower than the ferromagnetic powder used in the upper magnetic layer, such as γ-Fe$_2$O$_3$, barium ferrite or α-Fe, may be employed, and the binder may be the same as for the upper magnetic layer.

The lower magnetic layer and the upper magnetic layer may be sequentially or simultaneously coated. However, sequential coating is preferred for the reason that the interface between the two layers can be made uniform. In such a case, it is preferred that the lower magnetic layer is coated and dried until the amount of the remaining solvent becomes from $1 \times 10^{-15}$ to $1 \times 10^{-11}$ mg/µm$^3$, and then the upper magnetic layer is coated.

The magnetic recording medium of the present invention is produced by kneading and dispersing the above described respective components constituting the non-magnetic primer layer and the magnetic layer, respectively, together with the respective suitable solvents to form uniform coating materials, which are then coated on a flexible non-magnetic support.

As the solvent, a ketone such as methyl ethyl ketone, methyl isobutyl ketone or cyclohexanone, an alcohol such as methanol, ethanol, propanol or isopropanol, an ester such as methyl acetate, ethyl acetate or butyl acetate, an ether such as diethyl ether or tetrahydrofuran, an aromatic hydrocarbon such as benzene, toluene or xylene, or an aliphatic hydrocarbon such as hexane, may, for example, be used.

The preparation of a coating material for forming a non-magnetic primer layer and a magnetic coating material for forming the magnetic layer, can be carried out in accordance with a conventional method by means of a conventional kneading and dispersing apparatus.

The coating of the non-magnetic primer layer and the magnetic layer can be carried out in accordance with a conventional method by means of a conventional coating apparatus for e.g.gravure coating, roll coating, blade coating or extrusion coating. Usually, after coating and drying the non-magnetic primer layer, the magnetic layer is coated thereon. By such a sequential coating method, the variation (D) of the interface between the non-magnetic primer layer and the magnetic layer can readily be brought into a range of $D \leq 2L/K$ or $D \leq 2L'/K'$ as defined by the present invention. Here, $D \leq 2L/K$ or $D \leq 2L'/K'$ notionally means that the variation of the interface is restricted to a level of no more than two magnetic powders. In a preferred embodiment of the present invention, the non-magnetic primer layer is dried after coating, until the amount of the remaining solvent in the non-magnetic primer layer will be from $1 \times 10^{-15}$ to $1 \times 10^{-15}$ mg/$\mu$m$^3$, and then the coating material for the magnetic layer is coated thereon. In this manner, it is possible to control the fluctuation of the interface between the two layers to the minimum level and thereby to obtain a magnetic recording medium having excellent electromagnetic conversion characteristics, particularly little noise. Further, it is possible to reduce the amount of the residual solvent in the entire magnetic recording medium and thereby to obtain a magnetic recording medium excellent in the durability.

It is common that a magnetic field is applied to the magnetic layer before drying. Further, after the drying, calender treatment is applied to smooth the surface. With respect to rolls for calender treatment, it is common to employ a combination of a metal roll and a roll made of synthetic resin having heat resistance. However, only metal rolls may be used in combination. The treating temperature is preferably from 70 to 120° C., and the linear pressure is preferably from 200 to 500 kg/cm. Further, in a case where a crosslinking agent such as trimethylol propane adduct of tolylene diisocyanate is incorporated, curing is carried out at a temperature of from 50 to 70° C. for from 24 to 160 hours to carry out the crosslinking reaction of the crosslinking agent with the binder.

The surface roughness of the magnetic recording medium of the present invention is not more than 0.02 $\mu$m in order to minimize the space between the head and the magnetic layer. To accomplish this surface roughness, it is necessary not only to use a fine magnetic powder having a large specific surface area but also to adequately disperse the magnetic powder at the time of preparing the coating material for the magnetic layer. Further, it is also preferred to carry out the calender treatment after coating the magnetic layer, at a relatively high temperature. Taking into consideration sticking of the head, the surface roughness is preferably from 0.001 to 0.02 $\mu$m.

Further, the magnetic recording medium of the present invention is preferably dried to such an extent that the amount of the remaining solvent in the total of the non-magnetic primer layer and the magnetic layer is not more than $2 \times 10^{-12}$ mg/$\mu$m$^3$. If the amount of the remaining solvent is larger than this, not only the durability deteriorates, but the interface between the non-magnetic primer layer and the magnetic layer undergoes a change with time, whereby the electromagnetic conversion characteristics tend to deteriorate, and the noise tends to increase. The amount of the remaining solvent in the total of the non-magnetic primer layer and the magnetic layer is more preferably not more than $5 \times 10^{-13}$ mg/$\mu$m$^3$. Reduction of the amount of the residual solvent can be carried out by adjusting the conditions of the respective steps of drying, calendering and curing after coating the magnetic layer.

In the forgoing, preferred ranges of various constituting elements of the magnetic recording medium of the present invention, have been described. Now, a combination of such preferred ranges will be described with reference to two preferred embodiments of the present invention.

The first embodiment is a magnetic recording medium having a non-magnetic primer layer containing a binder and carbon black, on a flexible non-magnetic support, and having further thereon, a magnetic layer containing a binder and a ferromagnetic metal powder having a specific surface area of at least 40 m$^2$/g as measured by a BET method. In this case, it is more preferred that the non-magnetic primer layer and the magnetic layer contain a common binder, and this binder is adsorbable on the carbon black of the non-magnetic primer layer more than on the ferromagnetic metal powder of the magnetic layer. Further, the carbon black is particularly preferably one having a specific surface area of at least 120 m$^2$/g, an average particle size of at most 30 nm, a DBP oil absorption of at most 70 ml/100 g and a pH of at most 4.

The second embodiment is a magnetic recording medium having a non-magnetic primer layer comprising carbon black and a polyurethane resin, on a flexible non-magnetic support, and having further thereon, a magnetic layer containing a binder and a ferromagnetic metal powder having a specific surface area of at least 35 m$^2$/g as measured by a BET method, wherein the carbon black in the non-magnetic primer layer has a specific surface area of at least 100 m$^2$/g and a volatile content of at least 3%.

When the above mentioned two embodiments are employed, the variation (D) of the interface between the non-magnetic primer layer and the magnetic layer can easily be brought into a range of $D \leq 2L/K$ or $D \leq 2L'/K'$, as defined by the present invention.

Now, the present invention will be described in further detail with reference to Examples. However, it should be understood the present invention is by no means restricted to such specific Examples. Further, "parts" and "%" means "parts by weight" and "wt %", respectively.

EXAMPLES 1 to 7 AND COMPARATIVE
EXAMPLES 1 and 2

Preparation of a Coating Material for the Non-magnetic Primer Layer

Various components of the following Table 1 were mixed to prepare a coating material for the non-magnetic primer layer.

The preparation method was such that the carbon black, the polyester polyurethane and 120 parts of the solvent were mixed and kneaded, and the solvent was added thereto to a solid content of 30%, followed by dispersion by a sandmill. Then, the butyl stearate, the oleic acid, the crosslinking agent and the rest of the solvent were added thereto, followed by filtration with a filter having an average pore size of 1 $\mu$m to obtain a coating material.

TABLE 1

Coating material for non-magnetic primer layer

| | |
|---|---|
| Carbon black (specific surface area: 138 m²/g, as measured by BET method, DBP oil absorption: 60 ml/100 g, average particle size of primary particles: 24 nm) | 100 parts |
| Polyester polyurethane resin | 20 parts |
| Crosslinking agent | 7 parts |
| Butyl stearate | 4 parts |
| Oleic acid | 1 part |
| Solvent (Mixture of 62.5% of methyl ethyl ketone and 37.5% of cyclohexanone) | 400 parts |

Preparation of a Coating Material for the Magnetic Layer

Various components of the following Table 2 were mixed to obtain a coating material for the magnetic layer. The preparation method was such that the magnetic powder, the vinyl chloride type copolymer, the polyester polyurethane resin, the α-alumina, the carbon black and a part of the solvent were mixed and kneaded at a solid content concentration of 50%, and then the solvent was added to a solid content of 30%, followed by dispersion by a sandmill. Then, the butyl stearate, the oleic acid, the crosslinking agent, and the rest of the solvent were added thereto, followed by filtration with a filter having an average pore size of 1 μm to obtain a coating material.

TABLE 2

Coating material for magnetic layer

| | |
|---|---|
| Magnetic powder | 100 parts |
| Vinyl chloride copolymer | 10 parts |
| Polyester polyurethane resin | 4 parts |
| Crosslinking agent | 5 parts |
| α-Alumina (average particle size 0.2 μm, specific surface area: 9 m²/g as measured by a BET method) | 8 parts |
| Carbon black | 3 parts |
| Butyl stearate | 6 parts |
| Oleic acid | 1 part |
| Solvent (mixture of 50% of methyl ethyl ketone and 50% of cyclohexanone) | 360 parts |

Coating and Post-treatment:

On a polyethylene terephthalate film having a thickness of 75 μm, the coating material for the non-magnetic primer layer was coated by an extrusion method so that the dried thickness would be 1.0 μm. After drying, the coating material for the magnetic layer was coated thereon by the same extrusion method so that the dried thickness would be 0.3 μm, followed by drying at 80° C. for a few seconds. Then, calender treatment was carried out at 100° C. under 200 kg/cm, and curing was carried out at 60° C. for 72 hours. This product was punched out into a disk of 3.5 inch to obtain a magnetic disk, and its characteristics were evaluated. The results are shown in Table 3. The measurements were carried out as follows.

Amount of the Remaining Solvent:

Measured by gas chromatography (GC-5A, manufactured by Shimadzu Corporation). The column length was 1 m, the packing material was "Chromosorb 101" (manufactured by Johns Manville Company), the column temperature was 180° C., and helium was used as a carrier gas, which was permitted to flow at a rate of 50 m/min. For the measurement, the sample was heated to 150° C. to vaporize the remaining solvent.

Surface Roughness (Ra):

Measured by a non-contact type surface roughness meter (New View 100), manufactured by US ZYKO Company using a lens for 40 magnifications.

Durability:

Measured at 25° C. under a relative humidity of 50% by means for a floppy disk driving apparatus FD1137C manufactured by NEC.

Output:

Measured with a writing frequency of 500 kHz at a rotational speed of 360 rpm at a measuring position of R30 mm using a MIG head with a gap length of 44 μm by a spin stand.

Overwriting:

Measured by overwriting at 250 kHz after writing at 500 kHz.

C/N Ratio:

Calculated by measuring the noise and the output at 500 kHz using a spectrum analyzer Advantest TR4171.

Interface Variation (D):

A magnetic recording medium is cut perpendicular to the surface using a microtome with a diamond cutter. This cut surface is photographed with 150,000 magnifications by means of a transmission electron microscope. On the photograph, a portion of 2.0 μm of the length of the cross section is equally divided into 200, and the center line (a) is obtained, where the sum of squares of the distances ($y_n$) from the center line (a) to the interface:

$$\left[\sum_{n=1}^{200}(y_n - a)^2\right]$$

becomes the minimum.

The interface variation (D) is calculated by the following formula as an arithmetical mean of the absolute values of the distances ($k_n$) from the center line (a) to the interface:

$$D = \sum_{n=1}^{200}|K_n|/200$$

TABLE 3

| | Ex. 1 | Comp. Ex. 1 | Ex. 2[*1] | Ex. 3 | Comp. Ex. 2 | Ex. 4[*1] | Ex. 5 | Ex. 6 | Ex. 7[*1] |
|---|---|---|---|---|---|---|---|---|---|
| Magnetic powder[*2] | A | A | A | B | B | B | C | C | C |
| Solvent remaining in lower layer, before coating upper layer | 2E-12 | At least 2E-11 | 2E-12 | 1E-12 | At least 2E-11 | 1E-12 | 1E-12 | At least 2E-11 | 1E-12 |

TABLE 3-continued

|  |  | Ex. 1 | Comp. Ex. 1 | Ex. 2*1 | Ex. 3 | Comp. Ex. 2 | Ex. 4*1 | Ex. 5 | Ex. 6 | Ex. 7*1 |
|---|---|---|---|---|---|---|---|---|---|---|
| Interface variation | μm | 0.020 | 0.025 | 0.020 | 0.025 | 0.035 | 0.025 | 0.015 | 0.020 | 0.015 |
| Surface roughness | μm | 0.014 | 0.016 | 0.021 | 0.015 | 0.018 | 0.022 | 0.013 | 0.016 | 0.023 |
| C/N | dB | 59 | 53 | 54 | 54 | 48 | 49 | 48 | 44 | 45 |
| Output | % | 100 | 96 | 94 | 94 | 93 | 91 | 85 | 81 | 82 |
| Overwriting | dB | −35 | −33 | −33 | −34 | −31 | −32 | −33 | −31 | −31 |
| Durability | day | 22 | 4 | 20 | 25 | 5 | 25 | 30 | 15 | 32 |

*1 The calendering temperature was lowered from 100° C. to 80° C.
*2 A Fe—Co—Al alloy magnetic powder, average long axis length (L) = 0.11 μm, aspect ratio (K) = 10, coercive force = 1620 Oe, σs = 140 emu/g, 2 L/K = 0.022
B Fe—Co—Al alloy magnetic powder, average long axis length (L) = 0.17 μm, aspect ratio (K) = 10, coercive force = 1630 Oe, σs = 145 emu/g, 2 L/K = 0.034
C Hexagonal barium ferrite, plate length (L) = 0.05 μm, plate ratio (K') = 5, coercive force = 1500 Oe, σs = 60 emu/g, 2 L/K = 0.02

EXAMPLES 8 to 10 AND COMPARATIVE EXAMPLES 3 to 5

Preparation of Coating Liquids:

From various components of the following Tables 4 and 5, a coating liquid for the non-magnetic primer layer and a coating liquid for the magnetic layer, were prepared by means of a sandmill. However, preparation of the coating liquid for the magnetic layer was carried out as follows. Firstly, to alumina particles, 30 wt %, based thereon, of the vinyl chloride type copolymer was added, and the solvent was further added to bring the solid content concentration to 35%, followed by dispersion by the sandmill. Further, to the ferromagnetic metal powder, the rest of the vinyl chloride type copolymer and the polyester polyurethane were added, and the solvent was further added to bring the solid content concentration to 75%, followed by kneading, and then the carbon black and the solvent were added thereto to bring the solid content concentration to 35%, followed by dispersion by the sandmill. Then, the two mixtures were put together, and the tridecyl stearate, the oleic acid and the rest of the solvent were added, followed further by dispersion treatment to obtain the coating liquid.

Further, as the carbon black for the non-magnetic primer layer, one identified in the following Table 6 was used, and as the polyester polyurethane as the binder, one identified in the following Table 7, was used.

TABLE 4

Coating liquid for the non-magnetic primer layer

| Carbon black | 100 parts by weight |
|---|---|
| Polyester polyurethane | 20 parts |
| Methyl ethyl ketone | 200 parts |
| Cyclohexanone | 200 parts |

TABLE 5

Coating liquid for the magnetic layer

| Ferromagnetic metal powder (Fe/Co = 87/13 (atomic ratio), σs = 150 emu/g, Hc = 1700 Oe, specific surface area = 42 m2/g measured by a BET method) | 100 parts |
|---|---|
| Vinyl chloride copolymer | 12 parts |
| Polyester polyurethane (same as used for the non-magnetic primer layer) | 6 parts |

TABLE 5-continued

Coating liquid for the magnetic layer

| α-alumina (particle size: 0.2 to 0.4 μm) | 10 parts |
|---|---|
| Carbon black ① (furnace black; average particle size = 25 nm, specific surface area = 130 m²/g as measured by a BET method, DBP oil absorption = 65 ml/100 g) | 3 parts |
| Carbon black ② thermal black MT-CI; particle size = 200 to 500 nm, average particle size = 350 nm, specific surface area = 8 m²/g as measured by a BET method, DBP oil absorption = 7 ml/100 g) | 3 parts |
| Tridecyl stearate | 7 parts |
| Oleic acid | 1 part |
| Methyl ethyl ketone | 170 parts |
| Cyclohexanone | 170 parts |

TABLE 6

Carbon black for non-magnetic primer layer

|  | A | B | C | D |
|---|---|---|---|---|
| Particle size (nm) | 25 | 23 | 28 | 15 |
| Specific surface area by BET method (m²/g) | 138 | 131 | 90 | 250 |
| DBP oil absorption (ml/100 g) | 60 | 65 | 98 | 76 |
| pH | 3 | 3 | 7 | 8 |
| Adsorption to polyester polyurethane A (mg/g) | 120 | 100 | 23 | 17 |

TABLE 7

Polyester polyurethane as binder

|  | A | B | C |
|---|---|---|---|
| Weight average molecular weight | 35000 | 60000 | 25000 |
| Glass transition point (° C.) | 68 | −20 | 10 |
| Adsorption to carbon black A (mg/g) | 120 | 112 | 131 |
| Adsorption to ferromagnetic metal powder (mg/g) | 44 | 32 | 80 |

For the measurement of the adsorption, 20 parts by weight of the binder is added and dissolved in 300 parts by weight of tetrahydrofuran. To this solution, 100 parts by weight of the powder is added and dispersed for 10 hours by a paint shaker. Then, the dispersion is subjected to an ultracentrifugal separator to separate the precipitate and a supernatant, whereupon the concentration of the binder in the supernatant is measured.

Coating and Post-treatment:

To each coating liquid obtained as described above, 5 parts of a trimethylol propane adduct of tolylene diisocyanate (AD30 manufactured by Mitsubishi Chemical Corporation) was added as a crosslinking agent, followed by filtration with a filter having an average pore size of 1 μm, to obtain a coating material.

On a polyethylene terephthalate film having a thickness of 32 μm, the coating material for primer layer prepared as described above, was coated by an extrusion method so that the dried thickness would be 0.7 μm, and adequately dried. Then, the coating material for magnetic layer was coated thereon by the same extrusion method and dried at 80° C. No alignment treatment was carried out. Then, calender treatment was applied at 80° C. under 300 kg/cm, and then the product was punched out into a disk. This disk was maintained at 60° C. for 72 hours for curing.

Evaluation of the Physical Properties:

With respect to the magnetic disk obtained as described above, the 60° gloss and the haze as indices for the surface gloss, the surface roughness, the output and overwriting at 35 Kftpi as indices of the electromagnetic conversion characteristics, and the output variation, were measured, respectively, as follows. The results are shown in Table 8.

60° Gloss:

Measured by BYK Gardner surface gloss meter, with respect to one prior to calendar treatment.

Haze:

With respect to one prior to the calendar treatment, the intensity of reflected light deviated from the reflected light-receiving section of 200 loss, was measured by BYK Gardner surface gloss meter.

Surface Roughness:

Measured by a light interference type non-contact surface roughness meter (AYGO).

Reproducing Output and Overwrite:

The reproducing output was obtained by taking into and reading by an oscilloscope the waveforms of signals recorded at a recording density of 25 Kftpi. The overwrite was obtained in such a manner that after recording at a recording density of 17.5 Kftpi, the output was measured, and then recording was carried out at a recording density of 35 Kftpi, followed by reproduction, whereby the ratio of outputs at 17.5 Kftpi before and after the overwriting, was taken as the overwrite. The rotational speed of the the disk was 500 rpm, and the head used was a ferrite MIG head.

Output Variation:

The output variation is the variation in the output values before and after rotating a disk 5,000,000 times in contact with the head, and the evaluation was made in accordance with the following standards.

○: The variation was less than 5%

Δ: The variation was from 5 to 10%

X: The variation exceeded 10%

TABLE 8

|  | Ex. 8 | Ex. 9 | Ex. 10 | Comp. Ex. 3 | Comp. Ex. 4 | Comp. Ex. 5 |
|---|---|---|---|---|---|---|
| Carbon black in non-magnetic primer layer | A | B | A | C | D | A |

TABLE 8-continued

|  | Ex. 8 | Ex. 9 | Ex. 10 | Comp. Ex. 3 | Comp. Ex. 4 | Comp. Ex. 5 |
|---|---|---|---|---|---|---|
| Polyester-polyurethane | A | A | B | A | A | C |
| Ratio in adsorption on carbon black to on ferromagnetic metal powder | 2.7 | 2.3 | 3.5 | 0.5 | 0.4 | 1.6 |
| Thickness of magnetic layer (μm) | 0.3 | 0.3 | 0.3 | 0.3 | 0.3 | 1.0 |
| 60° gloss (ref %) | 125 | 117 | 118 | 72 | 64 | 96 |
| Haze | 88 | 108 | 108 | 222 | 272 | 183 |
| Surface roughness Ra (μm) | 0.011 | 0.021 | 0.012 | 0.028 | 0.032 | 0.020 |
| Output at 35 Kftpi (mV) | 104 | 101 | 98 | 89 | 87 | 85 |
| Overwrite (dB) | −37 | −36 | −35 | −29 | −29 | −28 |
| Output variation | ○ | ○ | Δ | X | X | X |
| Interface variation (μm) | 0.020 | 0.021 | 0.019 | 0.032 | 0.041 | 0.035 |

EXAMPLE 11 and COMPARATIVE EXAMPLES 6 to 9

Outputs were measured at various recording densities by changing the recording frequency using a MIG head by a spin stand at a rotational speed of 2945 rpm with the measuring position being 20 mm from the center, and they were represented by relative values to the output of Example 1 being 100 (in Table 3, values at 40 Kftpi are shown). The durability was determined in such a manner that by the above spin stand, a disk was driven for 120 hours in an atmosphere at a temperature of 25° C. with a relative humidity of 50% at a rotational speed of 2945 rpm with the measuring position being 20 mm from the center, and then the output at 40 Kftpi was measured and evaluated against the output before driving being 100.

Preparation of a Coating Material for the Non-magnetic Primer Layer:

Various components of the following Table 9 were blended and kneaded, and then dispersed by a sandmill. To this dispersion, 6 parts by weight of a crosslinking agent (trimethylolpropane adduct of tolylene diisocyanate; AD 30 manufactured by Mitsubishi Chemical Corporation) was added, followed by filtration with a filter having an average pore size of 3 μm to obtain a coating material for the non-magnetic primer layer.

TABLE 9

Coating material for non-magnetic primer layer
Composition of coating material for lower layer

| Carbon black | 100 parts |
|---|---|
| Polyester polyurethane resin | 20 parts |
| Tridecyl stearate | 3 parts |
| Oleic acid | 2 parts |
| Methyl ethyl ketone | 300 parts |
| Cyclohexanone | 100 parts |

Preparation of a Coating Material for the Magnetic Layer:

Various components of the following Table 10 were blended and kneaded, and then dispersed by a sand mill. To this dispersion, 5 parts by weight of a crosslinking agent (AD 30, manufactured by Mitsubishi Chemical Corporation) was added, followed by filtration with a filter having an average pore size of 1 μm to obtain a coating material for the magnetic layer.

TABLE 10

| Coating material for magnetic layer | |
| --- | --- |
| Metal magnetic powder (Fe—Co—Al alloy magnetic powder, average long axis length (L) = 0.11 μm, aspect ratio (K) = 10, coercive force = 1620 Oe, σs = 140 emu/g) | 100 parts |
| Vinyl chloride type copolymer | 15 parts |
| Polyester polyurethane resin having Sulfonic acid groups | 4 parts |
| α-Alumina | 20 parts |
| Carbon Black | 8 parts |
| Tridecyl stearate | 9 parts |
| Oleic acid | 1 part |
| Methyl ethyl ketone | 280 parts |
| Cyclohexanone | 120 parts |

Production of a Magnetic Recording Medium and Evaluation of Characteristics:

On a polyethylene terephtharate film having a thickness of 62 μm, the above coating material for the non-magnetic primer layer was coated so that a predetermined dried thickness would be obtained, and maintained in an atmosphere of 80° C. for a few minutes for drying. Then, the above coating material for the magnetic layer was coated thereon so that the dried thickness would be 0.3 μm, followed by drying. Calender treatment was applied thereto at 80° C. under 300 kg/cm, and then it was punched into a disk having a diameter of 3.5 inch. This disk was left to stand still horizontally at 50° C. for 48 hours for curing to obtain a magnetic recording medium. With respect to this magnetic recording medium, the output and durability at 40 Kftpi, and D50 were measured. The results are shown in Table 11.

TABLE 11

| | Carbon black in primer layer | Results of measurements | | | |
| --- | --- | --- | --- | --- | --- |
| | | Output | D50 (Kftpi) | Durability | Interface variation (μm) |
| Example 11 | A | 98 | 42.6 | 98 | 0.20 |
| Comparative example 6 | B | 89 | 33.0 | 80 | 0.35 |

As carbon black for the primer layer, the following materials were employed.
Carbon Black A in the Primer Layer:
  specific surface area=120 m$^2$/g, volatile content=3.5%, DBP oil absorption=65 ml/100 g, average particle size of primary particles=24 nm
Carbon Black B in the Primer Layer:
  Specific surface area=240 m$^2$/g, volatile component=1.0%, DBP oil absorption=165 ml/100 g, average particle size of primary particles=25 nm According to the present invention, it is possible to provide a magnetic recording medium which is excellent in the durability and in the electromagnetic conversion characteristics, particularly the output and the overwriting characteristic and which is suitable for high density recording.

What is claimed is:

1. A magnetic recording medium, comprising:

a flexible non-magnetic support a non-magnetic primer layer containing a binder composition and non-magnetic carbon black particles, formed on the support, and a magnetic layer having a thickness of at most 0.5 μm and comprising a binder composition and a ferromagnetic acicular metal powder having an average long axis length (L) of at most 0.20 μm and an aspect ratio (K) of at most 15, formed on the primer layer, wherein the binder composition of the non-magnetic primer layer and the binder composition of the magnetic layer have a common binder component, this common binder component being absorbable on the carbon black of the non-magnetic layer in an amount larger than on the ferromagnetic acicular metal powder of the magnetic layer, wherein the variation (D) of the interface between the magnetic layer and the non-magnetic primer layer is represented by: $D \leq 2L/K$.

2. The magnetic recording medium according to claim 1, wherein the magnetic layer has a surface roughness (Ra) of at most 0.02 μm.

3. The magnetic recording medium according to claim 2, wherein the ferromagnetic acicular metal powder has a specific surface area of at least 35 m$^2$/g as measured by a BET method.

4. The magnetic recording medium according to claim 2, wherein the non-magnetic primer layer contains carbon black and a polyurethane resin, and the carbon black has a specific surface area of at least 100 m$^2$/g and a volatile content of at least 3%.

5. A magnetic recording medium, comprising:

a flexible non-magnetic support, a non-magnetic primer layer containing a binder composition and non-magnetic carbon black particles, formed on the support, and a magnetic layer having a thickness of at most 0.5 μm and comprising a binder composition and a hexagonal system ferromagnetic metal power having a plate length (L') of at most 0.07 μm and a plate ratio (K') of at most 10 formed on the primer layer, wherein the binder composition of the non-magnetic primer layer and the binder composition of the magnetic layer have a common binder component, this common binder component being absorbable on the carbon black of the non-magnetic layer in an amount larger than on the hexagonal system ferromagnetic metal powder of the magnetic layer, wherein the variation (D) of the interface between the magnetic layer and the non-magnetic primer layer is represented by: $D \leq 2L'/K'$.

6. The magnetic recording medium according to claim 5, wherein the magnetic layer has a surface roughness (Ra) of at most 0.02 μm.

7. The magnetic recording medium according to claim 6, wherein the hexagonal system ferromagnetic powder has a specific surface area of at least 35 m$^2$/g as measured by a BET method.

8. The magnetic recording medium according to claim 6, wherein the non-magnetic primer layer contains carbon black and a polyurethane resin, and the carbon black has a specific surface area of at least 100 m$^2$/g and a volatile content of at least 3%.

* * * * *

UNITED STATES PATENT AND TRADEMARK OFFICE
CERTIFICATE OF CORRECTION

PATENT NO. : 6,207,267 B1
DATED : March 27, 2001
INVENTOR(S) : Osamu Shimomura, et al.

It is certified that error appears in the above-identified patent and that said Letters Patent is hereby corrected as shown below:

<u>Title page,</u>
Item [21], the Filing Date is listed incorrectly. Item [21] should read as follows:

-- Filed: Feb. 22, 2000 --

Item [30] is listed incorrectly. Item [30] should read as follows:

-- [30]  Foreign Application Priority Data

Apr. 8, 1997  (JP) ............................. 9-089571 --

Signed and Sealed this

Sixteenth Day of October, 2001

*Attest:*

NICHOLAS P. GODICI
*Attesting Officer*   Acting Director of the United States Patent and Trademark Office